United States Patent
Bouzguarrou et al.

(10) Patent No.: US 12,422,915 B2
(45) Date of Patent: Sep. 23, 2025

(54) SELECTIVE DEACTIVATION OF PREDICTION CIRCUITRY

(71) Applicant: Arm Limited, Cambridge (GB)

(72) Inventors: Houdhaifa Bouzguarrou, Austin, TX (US); Michael Brian Schinzler, Round Rock, TX (US)

(73) Assignee: Arm Limited, Cambridge (GB)

( * ) Notice: Subject to any disclaimer, the term of this patent is extended or adjusted under 35 U.S.C. 154(b) by 217 days.

(21) Appl. No.: 18/458,339

(22) Filed: Aug. 30, 2023

(65) Prior Publication Data

US 2025/0076962 A1  Mar. 6, 2025

(51) Int. Cl.
*G06F 1/32* (2019.01)
*G06F 1/3287* (2019.01)

(52) U.S. Cl.
CPC .................. *G06F 1/3287* (2013.01)

(58) Field of Classification Search
CPC .................................................. G06F 1/3287
See application file for complete search history.

(56) References Cited

U.S. PATENT DOCUMENTS

| | | | | |
|---|---|---|---|---|
| 6,282,663 B1 * | 8/2001 | Khazam | .................... | G06F 1/32 |
| | | | | 712/E9.05 |
| 7,218,217 B2 * | 5/2007 | Adonailo | ............... | G08B 29/24 |
| | | | | 340/522 |
| 2012/0166775 A1 * | 6/2012 | Krishnamurthy | ..... | G06F 9/3848 |
| | | | | 712/E9.045 |

* cited by examiner

*Primary Examiner* — Stefan Stoynov
(74) *Attorney, Agent, or Firm* — NIXON & VANDERHYE P.C.

(57) ABSTRACT

A data processing apparatus is provided. It includes first history storage circuitry that stores control flow information of control flow instructions. Second history storage circuitry stores a subset of the control flow information by considering a subset of the control flow instructions. Prediction circuitry produces a prediction for a specific one of the control flow instructions based on the subset of the control flow information and power control circuitry performs a determination of an extent to which the subset of the control flow information matches the control flow information and disables the prediction circuitry in dependence on a result of the determination.

18 Claims, 6 Drawing Sheets

SELECTIVE DEACTIVATION OF PREDICTION CIRCUITRY

TECHNICAL FIELD

The present disclosure relates to data processing and particularly prediction using control flow information.

DESCRIPTION

Prediction of control flow instructions may be achievable using the history of other control flow instructions. However, prediction circuitry can be power intensive, and it is desirable for such circuitry to be deactivated where possible.

SUMMARY

Viewed from a first example configuration, there is provided a data processing apparatus comprising: first history storage circuitry configured to store control flow information of control flow instructions; second history storage circuitry configured to store a subset of the control flow information by considering a subset of the control flow instructions; prediction circuitry configured to produce a prediction for a specific one of the control flow instructions based on the subset of the control flow information; and power control circuitry configured to perform a determination of an extent to which the subset of the control flow information matches the control flow information and to disable the prediction circuitry in dependence on a result of the determination.

Viewed from a second example configuration, there is provided a data processing method comprising: storing control flow information of control flow instructions; storing a subset of the control flow information by considering a subset of the control flow instructions; using prediction circuitry to produce a prediction for a specific one of the control flow instructions based on the subset of the control flow information; performing a determination of an extent to which the subset of the control flow information matches the control flow information; and disabling the prediction circuitry in dependence on a result of the determination.

Viewed from a third example configuration, there is provided a non-transitory computer-readable medium to store computer-readable code for fabrication of a data processing apparatus comprising: first history storage circuitry configured to store control flow information of control flow instructions; second history storage circuitry configured to store a subset of the control flow information by considering a subset of the control flow instructions; prediction circuitry configured to produce a prediction for a specific one of the control flow instructions based on the subset of the control flow information; and power control circuitry configured to perform a determination of an extent to which the subset of the control flow information matches the control flow information and to disable the prediction circuitry in dependence on a result of the determination.

Viewed from a fourth example configuration, there is provided a system comprising: the data processing apparatus, implemented in at least one packaged chip; at least one system component; and a board, wherein the at least one packaged chip and the at least one system component are assembled on the board.

Viewed from a fifth example configuration, there is provided a chip-containing product comprising the system assembled on a further board with at least one other product component.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
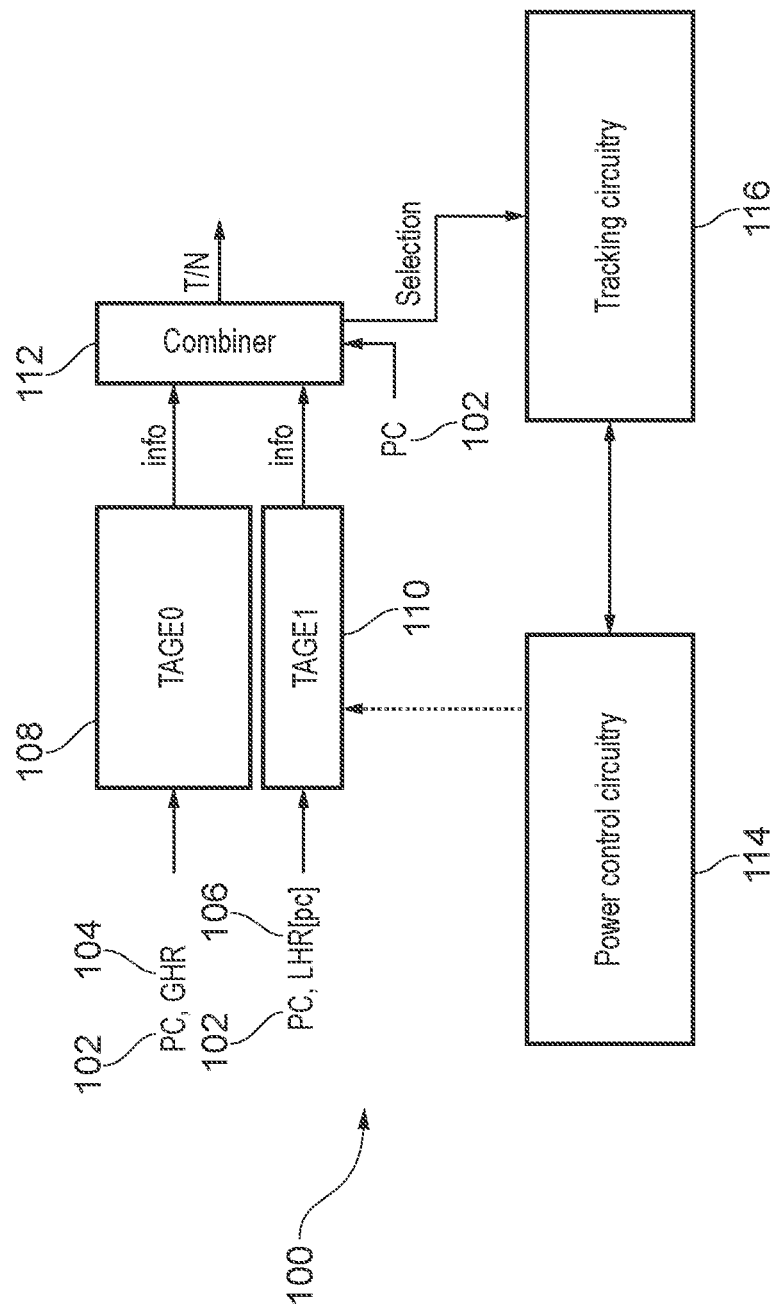
FIG. 1 schematically shows an example system 100 that implements the present technique.

Before discussing the embodiments with reference to the accompanying figures, the following description of embodiments is provided.

In some examples, there is provided a data processing apparatus comprising: first history storage circuitry configured to store control flow information of control flow instructions; second history storage circuitry configured to store a subset of the control flow information by considering a subset of the control flow instructions; prediction circuitry configured to produce a prediction for a specific one of the control flow instructions based on the subset of the control flow information; and power control circuitry configured to perform a determination of an extent to which the subset of the control flow information matches the control flow information and to disable the prediction circuitry in dependence on a result of the determination.

The above examples recognise that in certain circumstances, the prediction circuitry may be of little benefit. One situation that this might arise in is if the contents of the second history storage circuitry is similar to contents of the global history storage circuitry. In such a situation, it may be unlikely that second history storage circuitry adds anything new to the first history storage circuitry and therefore making a prediction on the basis of data from the first history storage circuitry is unlikely to be useful. In such a situation, it can be sensible to deactivate the prediction circuitry in order to save power. The history storage circuitry could take the form of registers. Alternative structures could be based on DRAM rather than registers. The predetermined amount could be represented by a ratio or a number. The term 'subset' is not intended to mean a strict subset and the 'subset of the control flow information' and the 'control flow information' could both be the same. The term is used herein to indicate that the subset of the control flow information is not a superset of the control flow information. That is, there is nothing in the subset of the control flow information that is not also found in the control flow information itself. The control flow information could take a number of forms. In some cases, the control flow information might be whether the control flow instruction (e.g. a branch instruction) was taken (T) or not taken (N), which can clearly be represented by a single bit. In other cases, the control flow information might be the address of a control flow instruction or it could be the address to which a control flow instruction jumped. In each of these cases, data might only be stored in the event that the control flow instruction was taken since the absence of information can be used to infer that no branch took place. Also in each case, it is possible for the data to be hashed before being stored. It will be appreciated that a combination of factors (including those not explicitly set out here) could be considered and that the use of a combination of factors is particularly well suited to the use of a hash. As will be explained below, there is no need for the determination to necessitate pattern matching between the first history control circuitry and the second history control circuitry.

In some examples, the first history storage circuitry is configured as global history storage circuitry; and the second history storage circuitry is configured as local history storage circuitry. Global history storage circuitry can, for instance, take the form of a global history register, which may store control flow information regarding the last N branches that have been encountered (N being an integer greater than 1). Local history storage circuitry can, for instance, take the form of a local history register, which only stores, as local history, a subset of this information. For instance, the local history might relate to 'nearby' branch instructions, branch instructions whose address matches a particular bit mask, or branch instructions where the most significant N bits are the same. There are a number of reasons to use local history registers, but one reason for doing so is the possibility of filtering out instructions that 'pollute' the relationship between the branch history and the action taken by another branch instruction. Typically, the global history register has a larger capacity than the local history register.

In some examples, the data processing apparatus comprises: further prediction circuitry configured to produce a further prediction for the specific one of the control flow instructions based on the control flow information from the first history storage circuitry. In these examples, a further prediction circuitry generates a prediction from the first history storage circuitry. Consequently, when there is a similarly between the contents of the first history storage circuitry and the second history storage circuitry, one might expect the predictions from the first history storage circuitry and second history storage circuitry to be the same. Indeed, in some situations the prediction produced by the first history storage circuitry using the full set of control flow information might be better because it includes all of the information in the second history storage circuitry and more.

In some examples, the data processing apparatus comprises tracking circuitry configured to track an accuracy of at least one of the prediction circuitry and the further prediction circuitry in response to the power control circuitry; and the power control circuitry is configured to keep the prediction circuitry enabled regardless of the subset of the control flow information matching the control flow information, in response to the accuracy falling below a predetermined threshold. The tracking circuitry tracks how the accuracy of either or both of the prediction circuitry and the further prediction circuitry and depending on this/these may allow the prediction circuitry to remain enabled. This represents the situation in which the prediction circuitry has been shown to be especially good at a particular moment in time. In these situations, it may be desirable to keep the prediction circuitry active just in case. For instance, it might be the case that additional information available to the further prediction circuitry actually causes the further prediction circuitry to produce a less good prediction. Consequently, even though the prediction circuitry might be making its prediction on only a subset of this information, it might be desirable to keep it active. The decision to keep the prediction circuitry active might depend on the accuracy of the prediction circuitry being high, the accuracy of the further prediction circuitry being low, or the accuracy of the prediction circuitry as compared to the further prediction circuitry being low. In addition, the decision might be based on a previous consideration of how these parameters change in response to enabling and disabling the prediction circuitry. For instance, if the overall prediction quality drops as a consequence of disabling the prediction circuitry then this might also discourage a disabling of the prediction circuitry.

In some examples, the power control circuitry is configured to perform the determination based on the extent to which the subset of the control flow information matches an end portion of the control flow information. Depending on how data is stored, the end portion of the control flow information might be the most recent or the least recent control flow information. However, in some embodiments, the end portion of the control flow information is the most recent control flow information in the first history storage circuitry.

In some examples, the data processing apparatus comprises: a plurality of second history storage circuits including the second history storage circuit, wherein each of the second history storage circuits is configured to store different subsets of the control flow information from different subsets of the control flow instructions. Where a number of different second history storage circuits are provided, the second history storage circuits might engage in filtering. That is, not every encountered instruction may have control flow information stored in every second history storage circuit but instead each control flow instruction might be stored in only some of the second history storage circuits and not stored in others. Each second history storage circuit therefore filters some control flow instructions.

In some examples, the power control circuitry is configured to perform the determination based on a number of consecutive times to which the one of the second history storage circuits has been written to. That is, there is no requirement for an actual matching to take place between the first history storage circuit and the second history storage circuit. It is instead possible for the similarity to be determined based on a count of the number of consecutive occasions that the second history storage circuit has been written to.

In some examples, previous storage update circuitry configured to store a reference to one of the second history storage circuits that was most recently updated; and storage counter circuitry configured to count the number of consecutive times to which the one of the second history storage circuits has been written to. In this way it is possible to determine which of the second history storage circuits may contain or be a subset of the first history storage circuit.

In some examples the power control circuitry is configured to produce the result as the subset of control flow information matches the control flow information in response to the storage counter circuitry reaching a predetermined amount and the previous storage update circuitry referring to the second history storage circuitry. It can be determined that there is a match between the subset of control flow information for one of the second storage circuits and the control flow information itself when the previous storage update circuitry points to that one of the second storage circuits and the storage counter circuitry reaching a predetermined amount. This indicates that particular second storage circuit has been written to the predetermined number of times. Since each write to each second storage circuit also occurs in the first storage circuit, this suggests that a large portion of the second storage circuit will be the same as in the first storage circuit.

In some examples, the power control circuitry is configured to re-enable the prediction circuitry in dependence on either: the storage counter circuitry no longer reaching the predetermined amount, or the previous storage update circuitry referring to storage circuitry other than the second history storage circuitry. In either of these two situations, the likelihood is that the second history storage circuitry and the first history storage circuitry will be sufficiently different that it is worth producing a prediction from the prediction circuitry and considering the prediction that it makes.

In some examples, the prediction circuitry is a TAGE predictor. A Tagged Geometric length (TAGE) predictor uses a number of tables into which varying lengths of previous control flow data are provided. Predictions are based on previously seen patterns that use the largest length of previous control flow data. Such systems operate on the principle that a previously seen behaviour is more likely to be accurate if it matches a longer series of previously seen actions that a shorter series of previously seen actions. Other embodiments may of course use other techniques other than TAGE that also use a history of previous control flow information.

In some examples, the extent to which the subset of the control flow information matches the control flow information corresponds with a number of consecutive entries of the first history storage circuitry that match in the second history storage circuitry. In these examples, for the prediction circuitry to be disabled, all of the entries are consecutive with each other thereby forming a single contiguous block of entries in the second history storage circuitry. As the size of this contiguous block increases, the extent to which the two storages are said to match also increases.

In some examples, the extent to which the subset of the control flow information matches the control flow information corresponds with a number of consecutive newest entries of the first history storage circuitry that match in the second history storage circuitry. The extent of the match may require the contiguous block of entries to be newest entries.

In some examples, the subset of the control flow information matches the control flow information when the second history storage circuitry is a most recent substring of the first history storage circuitry. Of course, it is possible for pattern matching to be used in order to determine the extent of the match and in these examples, a substring match is carried out. As previously explained, other techniques are also possible and may be more efficient than comparing strings.

Particular embodiments will now be described with reference to the figures.

FIG. 1 schematically shows an example system 100 that implements the present technique. In response to a given instruction such as a control flow instruction, the program counter value of that instruction together with the contents of the global history register (GHR) 104 can be provided to a TAGE predictor 108 (TAGE0). This results in some prediction information being produced, which is passed to a combiner 112.

At a similar time (potentially even in parallel), the program counter value 102 is provided, together with the contents of one of a number of local history registers (LHR) 106 to a second TAGE predictor 110 (TAGE1). This results in, potentially, different prediction information being produced, which is passed to the combiner 112. The combiner 112 takes the prediction information together with the current program counter value (i.e. of the instruction for which a prediction is to be made) and uses all of this information to produce a final prediction. This could be achieved by combining the two predictions in some manner, or by selecting one of the predictions that has historically produced the most accurate result.

In due course, the final state of the control flow instruction can be used to update the GHR and LHRs so that future control flow instructions can have predictions made using this new information. Any arbitration mechanism in the combiner 112 may also be updated in order to help provide accurate arbitration in the future between the two predictions produced by the prediction circuits 108, 110.

It will be appreciated that where the data stored in the selected LHR 106 and the GHR 104 is similar (such as when the LHR 106 contains a subset of the information in the GHR 104), the information produced by the TAGE predictors 108, 110 is likely to be the same. In this case, it makes sense to disable one of the predictors 108, 110. Typically, the storage capacity of the LHR 106 is less than that of the GHR 104. More history can lead to more accurate predictions and so it makes sense for the TAGE1 predictor 110 to be disabled. In addition, since the GHR 104 contains data that is usable to make a prediction for almost any control flow instruction, this saves the need to continually enable and disable the TAGE1 predictor 110. Power control circuitry 114 is responsible for disabling one of the TAGE predictors 108, 110 when the requisite condition is met.

In addition to this, tracking circuitry 116 is provided. As explained above, it is expected that the use of the TAGE1 predictor 110 in the specified circumstances will add little to nothing beyond the use of the TAGE0 predictor 108. In practice, there may be circumstances in which the TAGE0 predictor 108 produces worse results that would be achieved with the TAGE1 predictor 110. The tracking circuitry 116 is therefore able to track the success rate of using predictions with each of the TAGE0 and TAGE1 predictors 108, 110. This could be achieved by not allowing the power control circuitry 114 to disable the TAGE1 predictor 110 at the earliest opportunity in order to judge whether disabling it would be beneficial. This could also be judged by looking at the frequency of mispredictions that after the TAGE1 predictor 110 has been disabled and simply re-enabling it (despite the conditions being met) if the number of mispredictions exceeds a given threshold. Other possibility also exist.

In the above example, the GHR 104 acts as an example of the first history storage circuitry and the LHR acts as example of one of the second history storage circuits. The TAGE0 predictor 108 acts as an example of prediction circuitry and the TAGE1 predictor 110 acts as an example of the claimed (optional) further prediction circuitry.

The actual control flow information stored in the GHR 104 and LHR 106 is largely immaterial. In some examples, this may be a series of taken (T) and not taken (N) indicators of previously encountered instances of control flow instructions. In other examples, the information might be the program counter values of control flow instructions that are encountered or values to which a jump occurs as part of a branch operation. In each case, the data might only be stored in the event that a branch is taken from the corresponding instruction. Also in each case, the data might be hashed (potentially together with other information).

In practice, a number of LHRs 106 might be provided, with each of the LHRs 106 storing data from a subset of the instructions. Which of the LHRs 106 is used to store data from a particular control flow instruction can be decided in a number of ways, but in some examples this is determined based on upper bits of the program counter value of the control flow instruction. For instance, a first LHR 106a may be used to store data relating to control flow instructions having an address in the first 4 GB of address space, a second LHR 106b may be used to store data relating to control flow instructions having an address in the second 4 GB of address space and so on.

Figure 2:
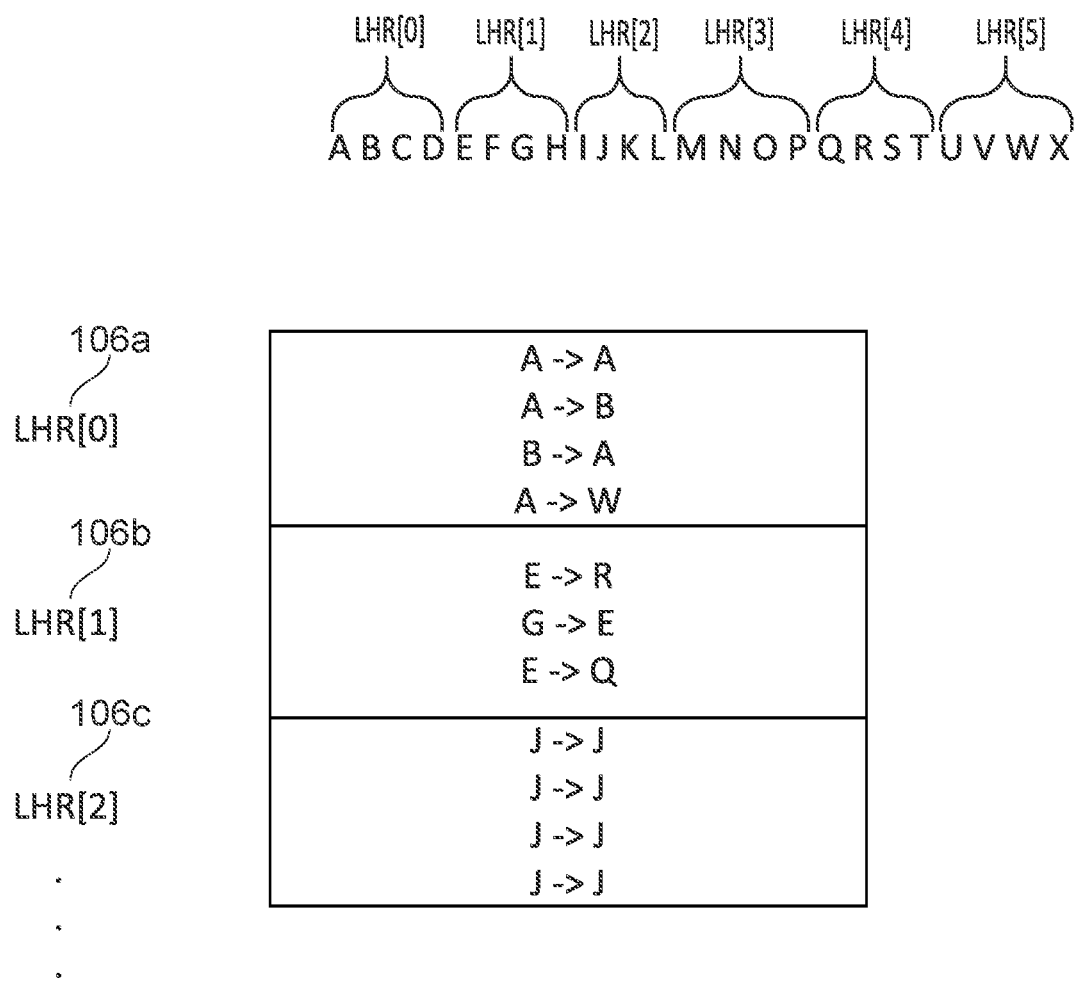
FIG. 2 shows an example in which a computer program contains branch instructions A-X.

FIG. 2 shows an example in which a computer program contains branch instructions A-X. These are binned or divided into six blocks that are covered by LHR[0] through to LHR[5], which each LHR 106 storing transitions from the next four branch instructions. FIG. 2 also illustrates the storage that might go on in each LHR 106. In this instance, the LHR 106 stores not merely whether a branch was taken but stores (hashed) the transition from the branch instruction to the target branch instruction when a branch is taken. As already stated, each LHR 106 only stores data for branch instructions within its 'bin'. Thus, when a prediction is to be made, the relevant LHR 106 (depending on the program address of the branch instruction) is activated and at least some of the contents of the LHR 106 are provided to TAGE1 110.

Figure 3:
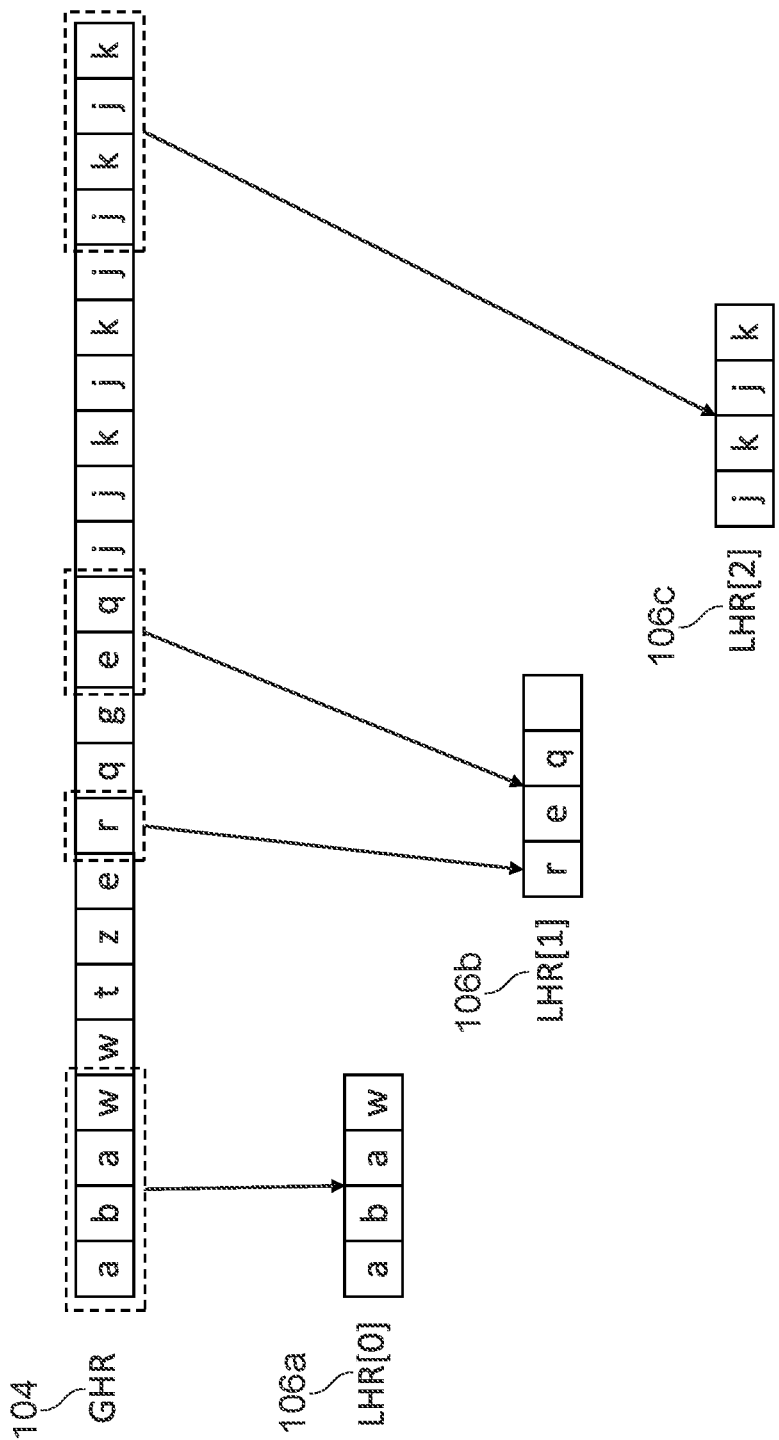
FIG. 3 shows the contents of the LHRs in combination with the contents of the GHR, in accordance with one example implementation.

FIG. 3 shows the contents of the LHRs 106 in combination with the contents of the GHR 104 as a demonstration of how the LHR 106 may be deactivated to little or no detrimental effect much of the time. Here, the contents of each LHR 106 are merely the target of each control flow instruction. Again, LHR[0] 106a handles program counter values a through to d, LHR[1] 106b handles program counter values e through to h, and LHR[2] 106c handles program counter values i through to 1. Meanwhile, the GHR 104 (which also stores the same data as stored in the LHRs) stores the target of every control flow instruction in the program. FIG. 3 only shows LHRs 0, 1, and 2 and LHRs 3, 4, 5, and 6 are not shown. It will be appreciated that the GHR is significantly larger (stores more entries) than any of the LHRs.

Here it can be seen that LHR[0] 106a is the same as the first part of the GHR 104. After the first four entries of the GHR 104 there are no more branches originating from any of program counter values a, b, c, or d and so even though numerous more control flow instructions are encountered, the contents of this LHR 106a remain the same.

LHR[1]'s 106b contents are made up of two parts. In the first part, as shown in the GHR 104, a branch occurs from instruction e to instruction r and so the target (r) is stored. Instructions r and q are not within the bin of LHR[1] 106b and so the branch from r to q and the branch from q to g (illustrated in the GHR 104) are not stored. However, instruction g does fall within the bin of LHR[1] 106b and so the target of the branch at instruction g (e) is stored. Instruction e is then also within the bit of LHR[1] 106b and so its target (q) is also stored. No further instructions within the bin of LHR[1] 106b are encountered and so the remaining entry of LHR[1] remains unfilled.

Finally, from the branch at instruction q, a series of branches between instructions j and k take place. Each of these falls within the bin of LHR[2] 106c and so the targets are all stored in LHR[2] 106c. In practice, due to the limited size of LHR[2] 106c only the most recent four relevant entries of the GHR 104 are stored in LHR[2] 106c.

Note that since the most recent entries of the GHR 104 cover the entirety of LHR[2] 106c, LHR[2] 106c may be said to offer little information beyond what can be extracted from the GHR. Indeed, the GHR 104 has significantly more history to work with in producing a prediction and so in most circumstances (but perhaps not all) the GHR 104 may be expected to produce a better prediction that the LHR 106. In these circumstances, the LHR 106 can be deactivated.

There are a number of ways in which the similarity of the LHR 106 and the GHR 104 can be measured in order to determine whether the LHR 106 should be deactivated. In some circumstances, the LHR 106 must be a most recent set or subset of the GHR 104. In other circumstances, it might be acceptable for most of the LHR 106 to be a subset of the GHR 104. For instance, perhaps the most recent three entries of the LHR 106 match the GHR 104 and this is sufficient for the LHR 106 to be deactivated. It will be appreciated that for larger LHRs 106, the tolerance could be higher. In some circumstances, training circuitry could be used to provide a confidence that the LHR 106 can be deactivated. Indeed, one purpose of the tracking circuitry 116 is to verify that the deactivation of the LHR 106 does not produce a detrimental result—for instance, if the fuller history of the GHR 104 actually leads to a worse prediction.

Figure 4:
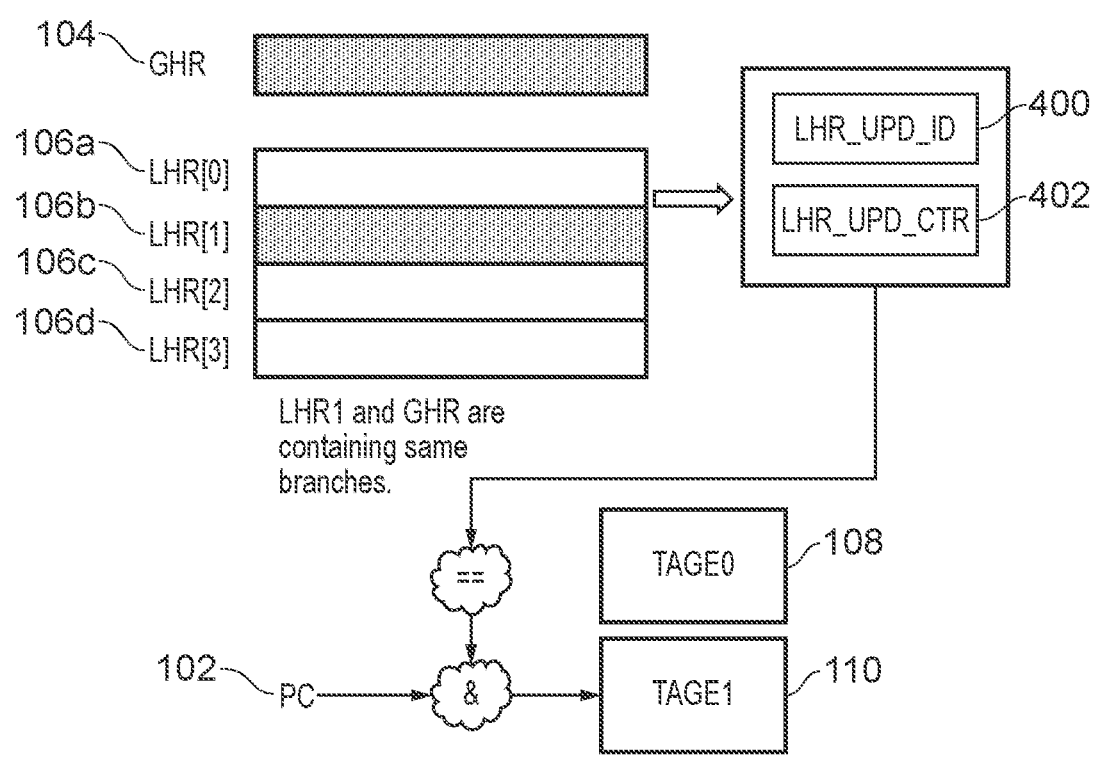
FIG. 4 shows an implementation in which the similarity of the LHR and the GHR can be determined without doing a string match.

FIG. 4 shows an implementation in which the similarity of the LHR 106 and the GHR 104 can be determined without doing a string match between the LHR 106 and the GHR 104. While this technique is possible, it is time consuming and costly in terms of circuitry. In the example of FIG. 4, two new storage units are provided. LHR_UPD_ID 400 identifies the LHR 106 that was most recently updated. Meanwhile, the counter LHR_UPD_CTR 402 counts the number of consecutive times that LHR 106 (the one identified by LHR_UPD_ID 400) has been written to.

The deactivation of an LHR is desired when the entirety of the LHR is found within most recent entries of the GHR. Deactivation therefore occurs when LHR_UPD_CTR is greater than or equal to a threshold (in this case, the size of the LHRs) and LHR_UPD_ID is the identifier of the LHR that is to be used for the current control flow instruction. When these requirements are met, TAGE1 110 can be deactivated. It can then be reactivated when either of these conditions are no longer met.

Figure 5:
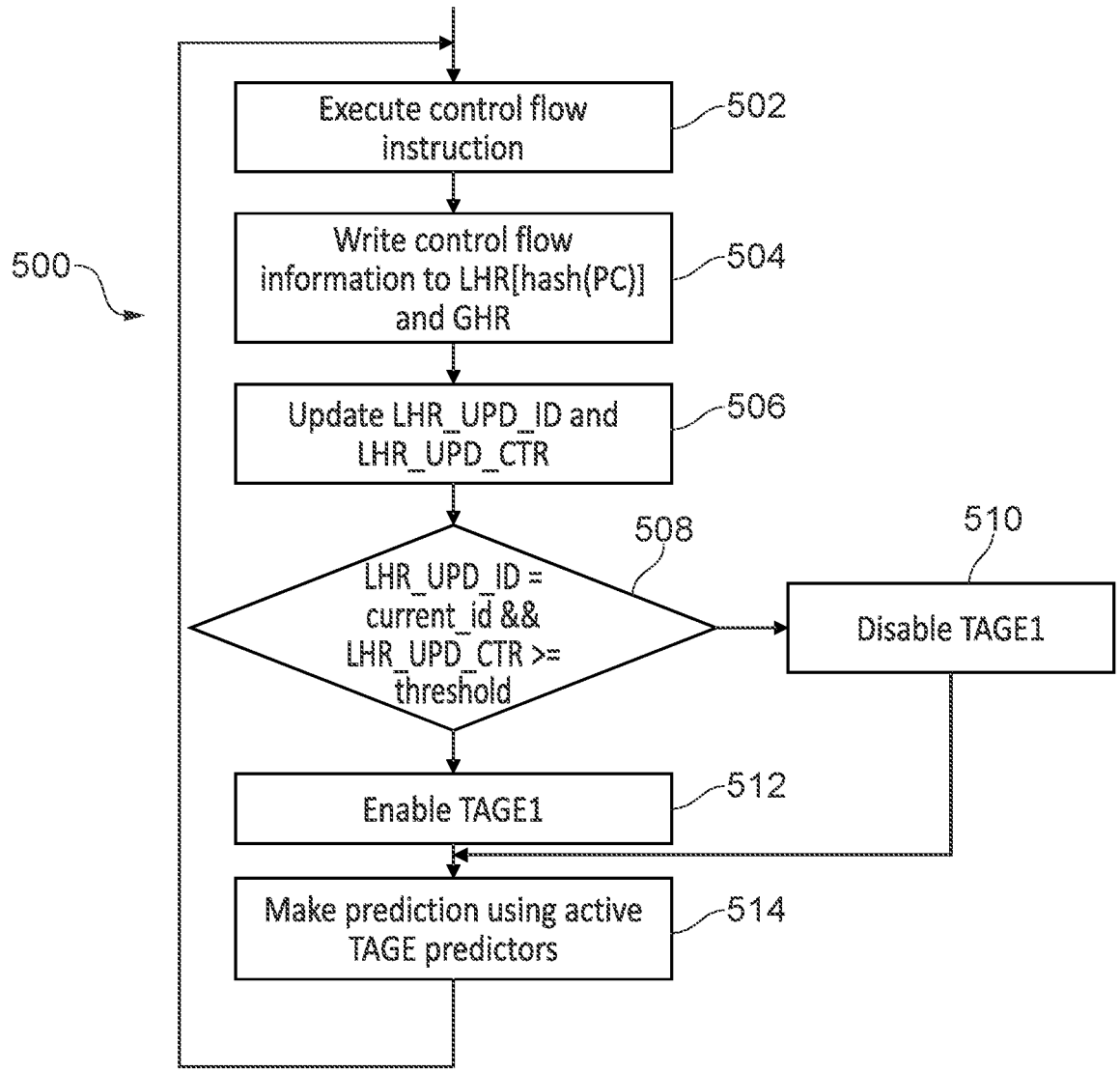
FIG. 5 illustrates a flowchart that shows a method of data processing in accordance with some examples.

FIG. 5 illustrates a flowchart 500 that shows a method of data processing in accordance with some examples. At a step 502, the control flow instruction is executed. Then, at a step 504, control flow information from the execution of the control flow instruction is written to the GHR and the relevant LHR (depending on, for instance, the address of the control flow instruction). Then at step 506, the counter and the LHR identifier are updated as appropriate. That is, if another write to the same LHR is made, then the counter is incremented, otherwise it is reset to 0. Meanwhile, the LHR identifier is set to the LHR that is being used for the current control flow instruction. At step 508, it is determined whether the most recent identifier is the identifier being used for the current control flow instruction and whether the counter is greater than or equal to the threshold. If both requirements are met, then at step 510, the TAGE1 predictor 110 is disabled and the process proceeds to step 514. Otherwise, at step 512, the TAGE1 predictor 110 is enabled. At step 514, a prediction is made using the active predictors (TAGE0 and possibly TAGE1).

In this way, it is possible to reduce power consumption by disabling the TAGE1 predictor when it is unlikely to produce useful predictions that cannot be achieved by the TAGE0 predictor.

Note that throughout this description, the example has been given of a TAGE predictor. However, the present technique is also applicable to other history based predictors such as perceptrons. Also in this example, the LHR has been selected based on a hash of a program counter value of the control flow instruction for which a prediction is to be produced. However, other criteria are equally usable such as the type of control flow instruction (e.g. with one LHR being used for indirect conditional branch instructions and another LHR being used for direct conditional branch instructions).

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 6:
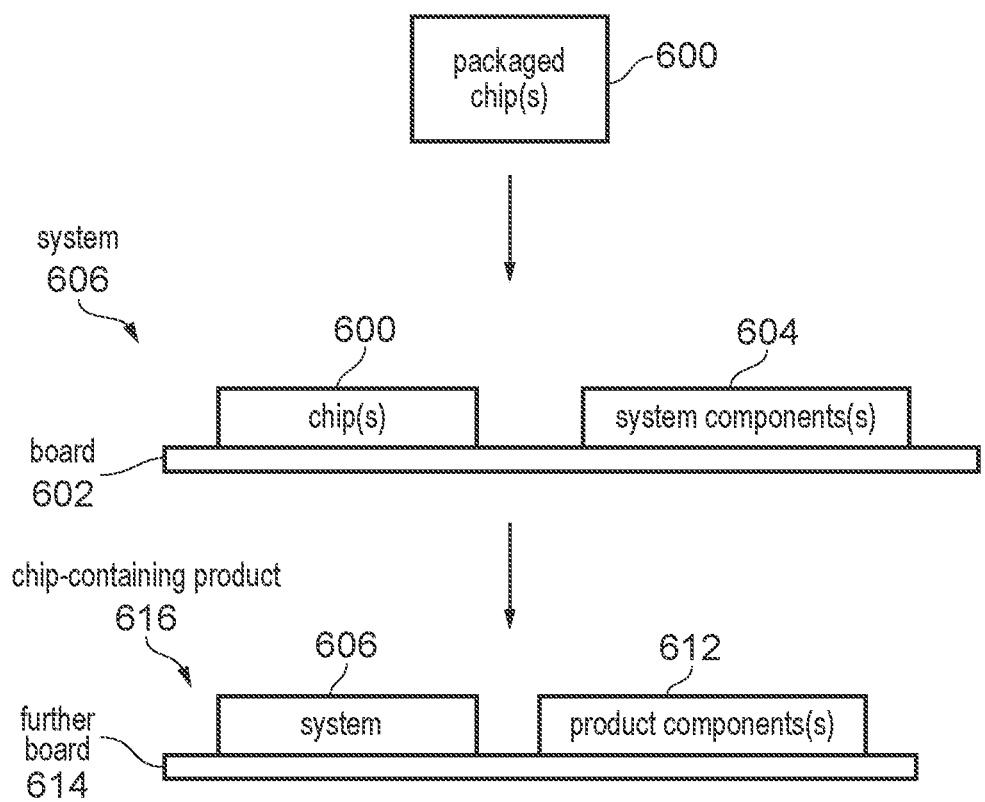
FIG. 6 shows an example with one or more chips.

As shown in FIG. 6, one or more packaged chips 600, with the apparatus described above implemented on one chip or distributed over two or more of the chips, are manufactured by a semiconductor chip manufacturer. In some examples, the chip product 600 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 600 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 600 are assembled on a board 602 together with at least one system component 604 to provide a system 606. For example, the board may comprise a printed circuit board. The board substrate may be made of any of a variety of materials, e.g. plastic, glass, ceramic, or a flexible substrate material such as paper, plastic or textile material. The at least one system component 604 comprise one or more external components which are not part of the one or more packaged chip(s) 600. For example, the at least one system component 604 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 616 is manufactured comprising the system 606 (including the board 602, the one or more chips 600 and the at least one system component 604) and one or more product components 612. The product components 612 comprise one or more further components which are not part of the system 606. As a non-exhaustive list of examples, the one or more product components 612 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 606 and one or more product components 612 may be assembled on to a further board 614.

The board 602 or the further board 614 may be provided on or within a device housing or other structural support (e.g. a frame or blade) to provide a product which can be handled by a user and/or is intended for operational use by a person or company.

The system 606 or the chip-containing product 616 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The present technique could be configured as follows.
1. A data processing apparatus comprising:
   first history storage circuitry configured to store control flow information of control flow instructions;
   second history storage circuitry configured to store a subset of the control flow information by considering a subset of the control flow instructions;
   prediction circuitry configured to produce a prediction for a specific one of the control flow instructions based on the subset of the control flow information; and
   power control circuitry configured to perform a determination of an extent to which the subset of the control flow information matches the control flow information and to disable the prediction circuitry in dependence on a result of the determination.

2. The data processing apparatus according to clause 1, wherein
   the first history storage circuitry is configured as global history storage circuitry; and
   the second history storage circuitry is configured as local history storage circuitry.
3. The data processing apparatus according to any preceding clause, comprising:
   further prediction circuitry configured to produce a further prediction for the specific one of the control flow instructions based on the control flow information from the first history storage circuitry.
4. The data processing apparatus according to clause 3, comprising:
   tracking circuitry configured to track an accuracy of at least one of the prediction circuitry and the further prediction circuitry in response to the power control circuitry; and
   the power control circuitry is configured to keep the prediction circuitry enabled regardless of the subset of the control flow information matching the control flow information, in response to the accuracy falling below a predetermined threshold.
5. The data processing apparatus according to any preceding clause, wherein
   the power control circuitry is configured to perform the determination based on the extent to which the subset of the control flow information matches an end portion of the control flow information.
6. The data processing apparatus according to any preceding clause, comprising:
   a plurality of second history storage circuits including the second history storage circuit, wherein each of the second history storage circuits is configured to store different subsets of the control flow information from different subsets of the control flow instructions.
7. The data processing apparatus according to clause 6, wherein
   the power control circuitry is configured to perform the determination based on a number of consecutive times to which the one of the second history storage circuits has been written to.
8. The data processing apparatus according to clause 7, comprising:
   previous storage update circuitry configured to store a reference to one of the second history storage circuits that was most recently updated; and
   storage counter circuitry configured to count the number of consecutive times to which the one of the second history storage circuits has been written to.
9. The data processing apparatus according to clause 8, wherein
   the power control circuitry is configured to produce the result as the subset of control flow information matches the control flow information in response to the storage counter circuitry reaching a predetermined amount and the previous storage update circuitry referring to the second history storage circuitry.
10. The data processing apparatus according to any one of clauses 7-9, wherein
   the power control circuitry is configured to re-enable the prediction circuitry in dependence on either:
      the storage counter circuitry no longer reaching the predetermined amount, or
      the previous storage update circuitry referring to storage circuitry other than the second history storage circuitry.

11. The data processing apparatus according to any preceding clause, wherein
the prediction circuitry is a TAGE predictor.

12. The data processing apparatus according to any preceding clause, wherein
the extent to which the subset of the control flow information matches the control flow information corresponds with a number of consecutive entries of the first history storage circuitry that match in the second history storage circuitry.

13. The data processing apparatus according to clause 12, wherein
the extent to which the subset of the control flow information matches the control flow information corresponds with a number of consecutive newest entries of the first history storage circuitry that match in the second history storage circuitry.

14. The data processing apparatus according to any preceding clause, wherein
the subset of the control flow information matches the control flow information when the second history storage circuitry is a most recent substring of the first history storage circuitry.

15. A data processing method comprising:
storing control flow information of control flow instructions;
storing a subset of the control flow information by considering a subset of the control flow instructions;
using prediction circuitry to produce a prediction for a specific one of the control flow instructions based on the subset of the control flow information;
performing a determination of an extent to which the subset of the control flow information matches the control flow information; and
disabling the prediction circuitry in dependence on a result of the determination.

16. A non-transitory computer-readable medium to store computer-readable code for fabrication of a data processing apparatus comprising:
first history storage circuitry configured to store control flow information of control flow instructions;
second history storage circuitry to store a subset of the control flow information by considering a subset of the control flow instructions;
prediction circuitry configured to produce a prediction for a specific one of the control flow instructions based on the subset of the control flow information; and
power control circuitry configured to perform a determination of an extent to which the subset of the control flow information matches the control flow information and to disable the prediction circuitry in dependence on a result of the determination.

17. A system comprising:
the data processing apparatus of any preceding clause, implemented in at least one packaged chip;
at least one system component; and
a board,
wherein the at least one packaged chip and the at least one system component are assembled on the board.

18. A chip-containing product comprising the system of clause 17 assembled on a further board with at least one other product component.

We claim:

1. A data processing apparatus comprising:
first history storage circuitry configured to store control flow information of control flow instructions;
second history storage circuitry configured to store a subset of the control flow information by considering a subset of the control flow instructions;
prediction circuitry configured to produce a prediction for a specific one of the control flow instructions based on the subset of the control flow information; and
power control circuitry configured to perform a determination of an extent to which the subset of the control flow information matches the control flow information and to disable the prediction circuitry in dependence on a result of the determination.

2. The data processing apparatus according to claim 1, wherein
the first history storage circuitry is configured as global history storage circuitry; and
the second history storage circuitry is configured as local history storage circuitry.

3. The data processing apparatus according to claim 1, comprising:
further prediction circuitry configured to produce a further prediction for the specific one of the control flow instructions based on the control flow information from the first history storage circuitry.

4. The data processing apparatus according to claim 3, comprising:
tracking circuitry configured to track an accuracy of at least one of the prediction circuitry and the further prediction circuitry in response to the power control circuitry; and
the power control circuitry is configured to keep the prediction circuitry enabled regardless of the subset of the control flow information matching the control flow information, in response to the accuracy falling below a predetermined threshold.

5. The data processing apparatus according to claim 1, wherein
the power control circuitry is configured to perform the determination based on the extent to which the subset of the control flow information matches an end portion of the control flow information.

6. The data processing apparatus according to claim 1, comprising:
a plurality of second history storage circuits including the second history storage circuit, wherein each of the second history storage circuits is configured to store different subsets of the control flow information from different subsets of the control flow instructions.

7. The data processing apparatus according to claim 6, wherein
the power control circuitry is configured to perform the determination based on a number of consecutive times to which the one of the second history storage circuits has been written to.

8. The data processing apparatus according to claim 7, comprising:
previous storage update circuitry configured to store a reference to one of the second history storage circuits that was most recently updated; and
storage counter circuitry configured to count the number of consecutive times to which the one of the second history storage circuits has been written to.

9. The data processing apparatus according to claim 8, wherein
the power control circuitry is configured to produce the result as the subset of control flow information matches the control flow information in response to the storage counter circuitry reaching a predetermined amount and the previous storage update circuitry referring to the second history storage circuitry.

10. The data processing apparatus according to claim 7, wherein
the power control circuitry is configured to re-enable the prediction circuitry in dependence on either:
the storage counter circuitry no longer reaching the predetermined amount, or
the previous storage update circuitry referring to storage circuitry other than the second history storage circuitry.

11. The data processing apparatus according to claim 1, wherein
the prediction circuitry is a TAGE predictor.

12. The data processing apparatus according to claim 1, wherein
the extent to which the subset of the control flow information matches the control flow information corresponds with a number of consecutive entries of the first history storage circuitry that match in the second history storage circuitry.

13. The data processing apparatus according to claim 12, wherein
the extent to which the subset of the control flow information matches the control flow information corresponds with a number of consecutive newest entries of the first history storage circuitry that match in the second history storage circuitry.

14. The data processing apparatus according to claim 1, wherein
the subset of the control flow information matches the control flow information when the second history storage circuitry is a most recent substring of the first history storage circuitry.

15. A data processing method comprising:
storing control flow information of control flow instructions;
storing a subset of the control flow information by considering a subset of the control flow instructions;
using prediction circuitry to produce a prediction for a specific one of the control flow instructions based on the subset of the control flow information;
performing a determination of an extent to which the subset of the control flow information matches the control flow information; and
disabling the prediction circuitry in dependence on a result of the determination.

16. A non-transitory computer-readable medium to store computer-readable code for fabrication of a data processing apparatus comprising:
first history storage circuitry configured to store control flow information of control flow instructions;
second history storage circuitry to store a subset of the control flow information by considering a subset of the control flow instructions;
prediction circuitry configured to produce a prediction for a specific one of the control flow instructions based on the subset of the control flow information; and
power control circuitry configured to perform a determination of an extent to which the subset of the control flow information matches the control flow information and to disable the prediction circuitry in dependence on a result of the determination.

17. A system comprising:
the data processing apparatus of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

* * * * *